United States Patent

Sundström

Patent Number: 5,699,619
Date of Patent: Dec. 23, 1997

[54] CHAIN SAW DRIVE SPROCKET DEVICE

[75] Inventor: Erik Sundström, Sandviken, Sweden

[73] Assignee: Sandvik AB, Sandviken, Sweden

[21] Appl. No.: 604,978

[22] PCT Filed: Aug. 22, 1994

[86] PCT No.: PCT/SE94/00757

§ 371 Date: Apr. 18, 1996

§ 102(e) Date: Apr. 18, 1996

[87] PCT Pub. No.: WO95/06549

PCT Pub. Date: Mar. 9, 1995

[30]  Foreign Application Priority Data

Sep. 3, 1993 [SE] Sweden ................................ 9302842

[51] Int. Cl.$^6$ ........................................ B27B 17/08
[52] U.S. Cl. .................... 30/383; 74/438; 474/156
[58] Field of Search ................................ 30/381, 383, 384, 30/385, 371; 474/153, 155, 156, 903; 74/438

[56]  References Cited

U.S. PATENT DOCUMENTS 3,163,052  12/1964  Oehrli et al. .
3,669,162   6/1972  Irgens .................................. 74/438 X
3,857,179  12/1974  Haupt et al. .
5,021,033   6/1991  Sundström .

FOREIGN PATENT DOCUMENTS 13515  of 1851  United Kingdom .................... 74/438

Primary Examiner—Douglas D. Watts
Attorney, Agent, or Firm—Burns, Doane, Swecker & Mathis, L.L.P.

[57]  ABSTRACT

Drive sprocket device for a chain saw, comprising a rim type sprocket located eccentrically in a ring. The ring has recesses on its outside periphery to receive tangs of drive links of a saw chain, and cylindrical surfaces to support the chain radially. On the inside periphery of the ring there are radial protrusions and cylindrical surfaces. The sprocket has recesses to receive the protrusions, and cylindrical surfaces in contact with the cylindrical surfaces formed on the inside periphery of the ring. Alternatively, the recesses in the ring could constitute through-holes, and the tangs of the drive links could extend through the through-holes to constitute the protrusions received in the sprocket recesses.

8 Claims, 2 Drawing Sheets

CHAIN SAW DRIVE SPROCKET DEVICE

BACKGROUND

In chain saws power is transmitted from a rotating shaft to a saw chain running along a guide bar. The rotating shaft is on handheld saws usually a tubular shaft extending from a centrifugal clutch drum, on vehicle born saws usually the solid shaft of a hydraulic motor. In known saws the guide bar is rigidly mounted in relation to the rotating shaft when actually sawing. With this arrangement the outgoing chain part will lose some tension since the ingoing chain part is extended by elastic strain, and the whole chain by heat expansion and wear. The contact force between the outgoing chain part and the guide bar will then decrease, with a risk that the chain can leave the chain groove and cause an accident if the tension reaches zero. It is desirable to ensure that the tension is always high enough in the outgoing chain part in spite of cutting forces, impacts or chain extension, and low enough to avoid breaking when a heated chain cools.

The problem has been long known from various chain or belt transmissions and has been solved either by adjustable idler wheels, or by pivoting drives where the output sprocket is not concentric with the pivot axis. If the radius of the output sprocket is larger than the distance between the pivot axis and the sprocket center, the ratio between tensions in outgoing and incoming chain parts will always be a positive number and the tension in the outgoing part can never reach zero. This arrangement was marketed as the "Sespa" gear around 1950.

Corresponding arrangements adapted to the special demands of chain saws have been described in patents SE 469 515 and DE 41 37 409. Chain saws differ from other applications by an extremely difficult environment with severe vibrations and large amounts of moist or oily sawdust, and both cited patents describe variations of the "Sespa" concept where the space inside the drive has been filled out and sealed to keep out sawdust.

Another problem with the drives described in the cited patents is the transmission of radial forces, since the space for roller bearings is very restricted. The patents also describe the possibilities of filling the space between gears with low-friction material acting as a solid bearing, or letting the gear teeth carry the radial load, which in practice will greatly shorten their lifetime.

The present invention concerns an improved drive sprocket device for use on chain saws, where forces are transmitted between a drive shaft and a saw chain without use of roller bearings, solid bearings, gear teeth or other vulnerable elements, utilizing only elements which have been proven insensitive to sawdust.

SUMMARY OF THE INVENTION

According to the invention the drive sprocket device comprises one outer ring and one inner sprocket. The inner sprocket is mounted on the drive shaft and is basically a traditional rim sprocket as described in patents U.S. Pat. No. 3,163,052, U.S. Pat. No. 5,021,033 and DE 36 25 277, with an outer surface comprising two sustantially cylindrical portions and between them rows of recesses shaped to receive the tangs of drive links of the chain.

The outer ring is made with an outer surface similar to the outer surface of the sprocket, with two cylindrical portions and between the a row of recesses shaped to receive the tangs of the drive links. The inside of the ring is made as two cylindrical portions and between the a row of protrusions of a shape corresponding to the tangs of the drive links. In a special embodiment of the invention, the protrusions are actual tangs of the chain reaching through the recesses on the outside and emerging on the inside.

In normal use, the center of the ring should be located in front of the drive shaft, which allows the radial force and a large part of the tangential force to be transmitted as contact force between the smooth cylindrical surfaces on the inside of the ring and the outside of the sprocket. No bearing is needed in such a case.

To reduce the transverse force on the protrusions, the ring or the sprocket can be made with guiding flanges.

If it is desired to displace the center of the ring further to the rear than the drive shaft in order to compensate especially great changes in chain length, it becomes necessary to transmit radial forces otherwise than as contact force between the cylindrical surfaces mentioned. If the diameter of the sprocket is less than half the inner diameter of the ring, the, radial force can be transmitted without solid or roller bearings by means of a single intermediate roller to a small diameter pillar concentrically fastened to a flange on the ring. The diameters of the roller and the cylinder can be chosen to avoid any slipping.

Since all radial forces are transmitted through rolling contact between a few cylindrical surfaces the device according to the invention is very durable, and because of the small number of components, price and reliability will be favourable compared to devices where radial forces are transmitted through conventional roller or solid bearings. It will be easy to replace worn parts or the whole device. Since the sprocket is a standard item it may be possible to remove the ring only, and let the chain run directly on the sprocket if there is no need to compensate for elongation of the chain. It will also be possible to exchange one ring for a ring of different diameter to alter the ratio between tensions in the chain parts.

DETAILED DESCRIPTION OF PREFERRED EMBODIMENTS OF THE INVENTION

Figure 1:
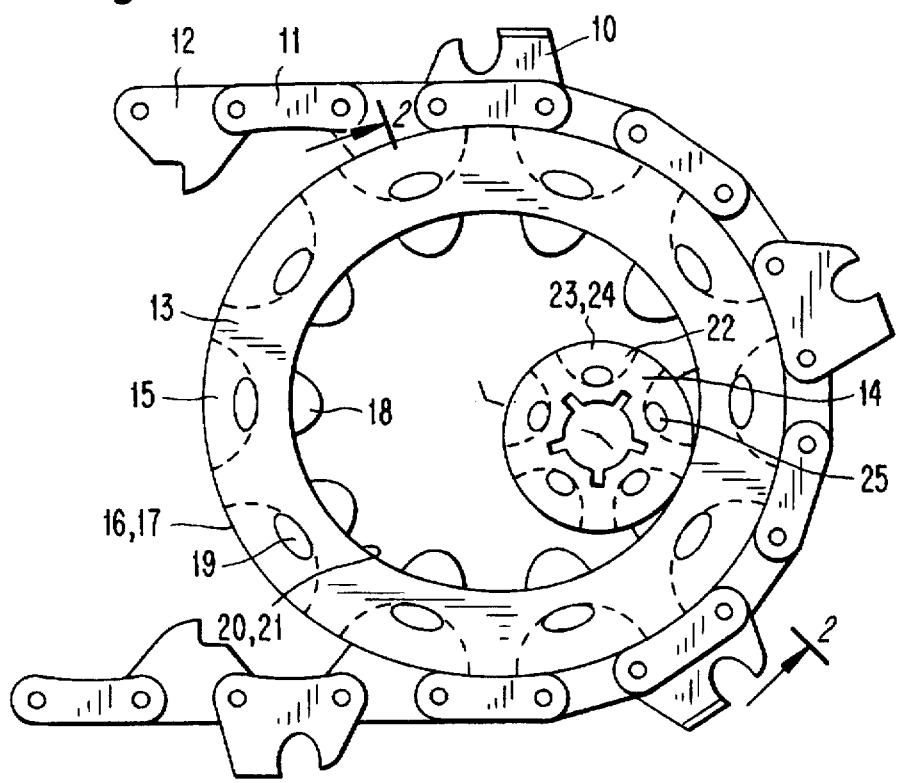
FIG. 1 shows a side view of the saw chain, the ring and the sprocket, taken along lien 2—2 in FIG. 1.

FIG. 1 shows a saw chain comprising cutter links (10), side links (11) and drive links (12) running around a ring (13) which is supported by a drive sprocket (14) fastened to a drive shaft. The drive links (12) have tangs reaching into recesses (15) on the outside of the ring. On both sides of the recesses are substantially cylindrical surfaces (16, 17) carrying the side links (11) and cutter links (10) of the chain and transmitting radial forces between the chain and the ring (13). Tangential forces are transmitted from the ring (13) to the chain in the recesses (15) and as friction on the cylindrical surfaces (16, 17). The deepest parts of the recesses (15) have openings (19) through which sawdust and lubricant brought by the chain can be ejected without clogging the recesses. The cylindrical surfaces (16, 17) on the outside may be interrupted opposing the recesses (15), since no chain links will be supported there.

The inside of the ring carries a plurality of protrusions (18) with a shape corresponding to the tangs of the drive links (12), and has cylindrical surfaces (20, 21) on both sides of the protrusions. The number of protrusions (18) and recesses (15) can be equal or unequal. The inner sprocket (14) is a traditional rim sprocket with a plurality of recesses (22) on its periphery, in which the protrusions (18) of the ring are received. On both sides of the recesses (22) are cylindrical surfaces (23, 24) in rolling contact with the cylindrical surfaces (20, 21) on the inside of the ring, whereby the surfaces 20, 21 are radially supported solely by the sprocket 14. In their deepest parts the sprocket recesses (22) have openings (25) to the side or inwards where sawdust and lubricant can be ejected without clogging the recesses. Radial forces are transmitted from the sprocket to the ring as a contact force where the cylindrical surfaces touch, as long as the center of the ring is farther to the front than the center of the drive shaft.

The inside (26) of the sprocket is in known manner designed for mounting on the drive shaft with torque transmission through splines, claws or keyways.

Figure 2:
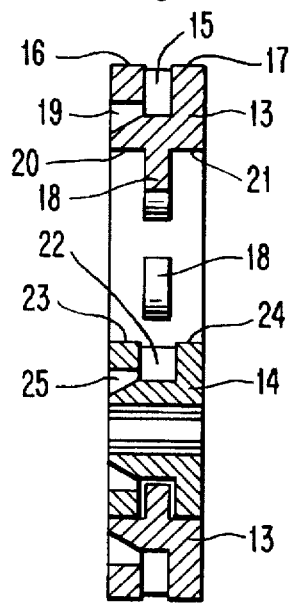
FIG. 2 a section through the ring and the sprocket.

FIG. 2 shows in a cross-section through the contact point between the ring (13) and the sprocket (14) how the protrusions (18) on the inside of the ring are received in the recesses (22) of the sprocket.

Figure 3:
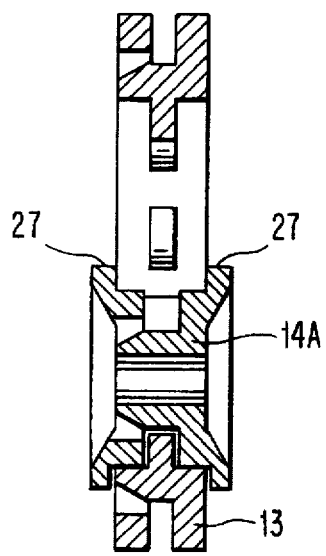
FIG. 3 a section through the ring and a modification of the sprocket where the sprocket is made with flanges.
Figure 4:
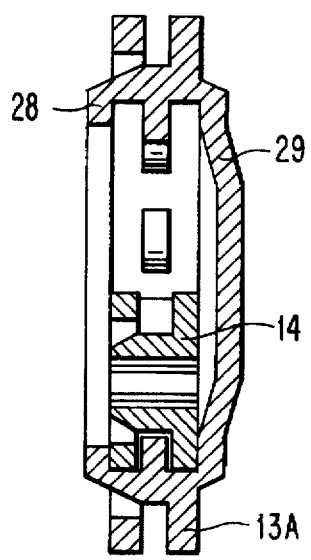
FIG. 4 a section through a modification of the ring and the sprocket where the ring is made with flanges.

FIG. 3 shows in a cross-section how the sprocket (14A) can be made with flanges (27) for better lateral guiding of the ring (13). FIG. 4 shows how the ring (13) can be provided with flanges (28, 29) for better lateral guiding, where the flange (29) on the terminating side of the drive shaft may be extended all the way to the center to prevent intrusion of sawdust. If desired, a spring (not shown) may be applied to the flange (29) to hold the ring (13A) in a well defined position when the chain saw is not running.

Figure 5:
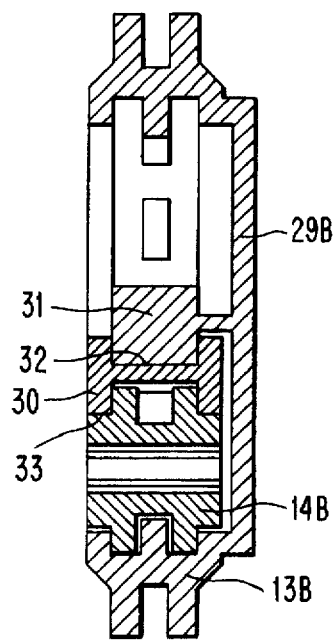
FIGS. 5 and 6 show sections through another embodiment of the ring and the sprocket where an intermediate roller is located between the sprocket and a pillar concentric with the ring.
Figure 6:
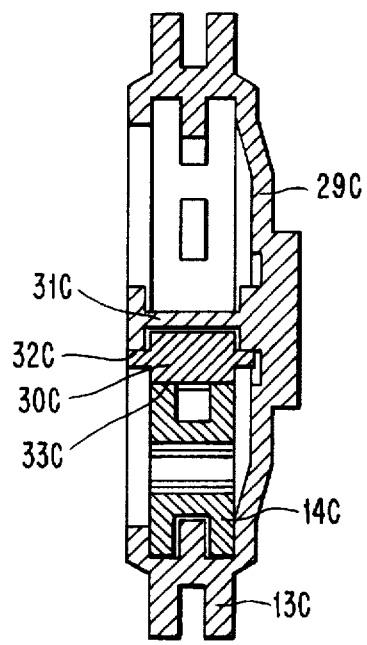

FIGS. 5 and 6 show in cross-sections through the contact point between the ring and the sprocket two embodiments where radial forces can be transmitted from the sprocket to the ring outwardly at the contact point as well as inwardly via a roller to a pillar affixed to the flange of the ring. In FIG. 5, radial forces are transmitted inwardly via roller (30) to a pillar (31) affixed to a flange (29B) of the ring (13B). To keep the roller (30) aligned in the same plane as the centers of the ring (13B) and the sprocket (14B) without any slippage, the roller is made with cylindrical surfaces (32, 33) of different diameters, where the surface (32) in contact with the pillar (31) has a smaller diameter than the surface (33) in contact with the sprocket.

In FIG. 6, radial forces are transmitted inwardly via a roller (30C) to a pillar (31C) affixed to flange (29C) of the ring (13C). To keep the roller (30C) aligned in the same plane as the centers of the ring (13C) and sprocket (14C) without any slippage, the roller is made with cylindrical surfaces (32C, 33C) of different diameters, wherein the surface (32C) is in contact with the pillar (31C) and has a smaller diameter than the surface (33C) which is in contact with the sprocket (14C). To assure the correct position of the roller (30, 30C) between the pillar (31, 31C) and the sprocket when the radial force on the ring is directed outwards, the roller can be guided by simple plastic inserts, which do not carry any load.

Figure 7:
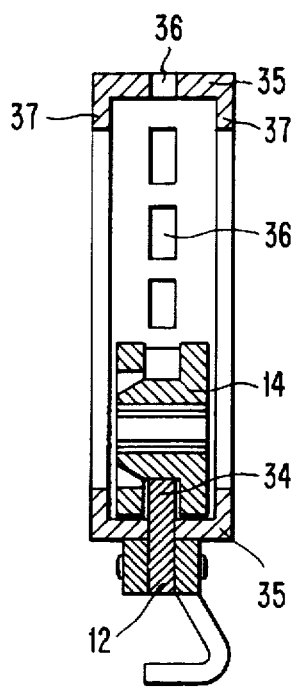
FIG. 7 shows a section of the chain, the ring and the sprocket where the ring is so thin that the protrusions on the inside of the ring consist of drive link tangs reaching through the ring and emerging on the inside.
Figure 8:
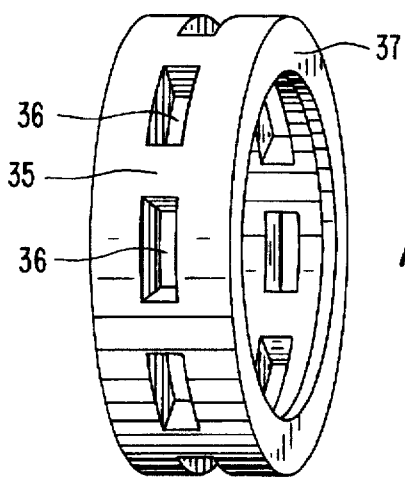
FIG. 8 is a perspective view of the ring depicted in FIG. 7.

FIG. 7 shows a cross-section and FIG. 8 a perspective view of an embodiment of the invention, where the ring (35) is thinner compared to the ring in FIGS. 2 to 6, and where tangs (34) of drive links (12) penetrate the ring through cutouts (36) thereof and are received in the recesses (22) of the sprocket (14). To get sufficient stiffness and lateral stability the ring is provided with flanges (37) extending radially inwards or outwards.

I claim:

1. A chain saw comprising:

a saw chain including side links, cutter links, and drive links with inwardly projecting tangs;

a rotary drive shaft;

a sprocket mounted on the rotary drive shaft, the sprocket including radially outwardly open first recesses spaced circumferentially apart, and first cylindrical surfaces projecting from opposite side edges of the first recesses;

a ring arranged eccentrically with respect to the sprocket, the sprocket disposed within the ring, the ring including radially outwardly open second recesses for receiving the tangs of the drive links for transmitting tangential forces thereto, and second cylindrical surfaces projecting from opposite side edges of the second recesses for transmitting radial forces to the side links, the ring further including inward protrusions receivable in the first recesses for receiving tangential forces from the sprocket, and third cylindrical surfaces projecting from opposite sides of the protrusions, the third cylindrical surfaces being in contact with the first cylindrical surfaces for transmitting radial forces therebetween, the third cylindrical surfaces having a larger diameter than the first cylindrical surfaces and being supported radially solely by the sprocket.

2. The chain saw according to claim 1, wherein the sprocket includes flanges disposed at axially outer edges of the first cylindrical surfaces and projecting radially outwardly with respect to the first cylindrical surfaces, the ring traveling between the flanges and guided thereby.

3. The chain saw according to claim 1, wherein the ring includes flanges disposed at axially outer edges of the third cylindrical surfaces and extending radially inwardly with respect to the third cylindrical surfaces, the socket traveling between the flanges and guided thereby.

4. The chain saw according to claim 3, wherein one of the flanges extends completely across one axial end of the ring.

5. The chain saw according to claim 4 including a pillar projecting axially inwardly from the one flange along a center axis of the ring, and a roller interposed between the sprocket and pillar and rotatable about an axis extending between and parallel to center axes of the sprocket and ring, the roller transmitting radial forces from the sprocket to the pillar.

6. A chain saw comprising:

a saw chain including side links, cutter links, and drive links with inwardly projecting tangs;

a rotary drive shaft;

a sprocket mounted on the rotary drive shaft, the sprocket including radially outwardly open first recesses spaced circumferentially apart, and first cylindrical surfaces projecting from opposite side edges of the first recesses;

a ring arranged eccentrically with respect to the sprocket, the sprocket disposed within the ring, the ring including radially extending through-holes spaced apart circumferentially around the ring, the tangs of the drive links projecting through the through-holes and received in the first recesses for transmitting tangential forces from the sprocket to the ring and the drive links, and second cylindrical surfaces projecting from opposite side edges of the through-holes at an outer periphery of the ring for transmitting radial forces to the side links, the ring further including third cylindrical surfaces projecting from opposite side edges of the through-holes at an inner periphery of the ring, the third cylindrical surfaces being in contact with the first cylindrical surfaces for transmitting radial forces therebetween, the third cylindrical surfaces having a larger diameter than the first cylindrical surfaces and being supported radially solely by the sprocket.

7. A chain saw comprising:

a saw chain including side links, cutter links, and drive links with inwardly projecting tangs;

a rotary drive shaft;

a sprocket mounted on the rotary drive shaft, the sprocket including radially outwardly open first recesses spaced circumferentially apart, and first cylindrical surfaces projecting from opposite side edges of the first recesses;

a ring arranged eccentrically with respect to the sprocket, the sprocket disposed within the ring, the ring including radially outwardly open second recesses for receiving the tangs of the drive links for transmitting tangential forces thereto, and second cylindrical surfaces projecting from opposite side edges of the second recesses for transmitting radial forces to the side links, the ring further including inward protrusions receivable in the first recesses for receiving tangential forces from the sprocket, and third cylindrical surfaces projecting from opposite sides of the protrusions, the third cylindrical surfaces being in contact with the first cylindrical surfaces for transmitting radial forces therebetween, the third cylindrical surfaces having a larger diameter than the first cylindrical surfaces, wherein the sprocket includes flanges disposed at axially outer edges of the first cylindrical surfaces and projecting radially outwardly with respect to the first cylindrical surfaces, the ring traveling between the flanges and guided thereby.

8. A chain saw comprising:

a saw chain including side links, cutter links, and drive links with inwardly projecting tangs;

a rotary drive shaft;

a sprocket mounted on the rotary drive shaft, the sprocket including radially outwardly open first recesses spaced circumferentially apart, and first cylindrical surfaces projecting from opposite side edges of the first recesses;

a ring arranged eccentrically with respect to the sprocket, the sprocket disposed within the ring, the ring including radially outwardly open second recesses for receiving the tangs of the drive links for transmitting tangential forces thereto, and second cylindrical surfaces projecting from opposite side edges of the second recesses for transmitting radial forces to the side links, the ring further including inward protrusions receivable in the first recesses for receiving tangential forces from the sprocket, and third cylindrical surfaces projecting from opposite sides of the protrusions, the third cylindrical surfaces being in contact with the first cylindrical surfaces for transmitting radial forces therebetween, the third cylindrical surfaces having a larger diameter than the first cylindrical surfaces, wherein the ring includes flanges disposed at axially outer edges of the third cylindrical surfaces and extending radially inwardly with respect to the third cylindrical surfaces, the socket traveling between the flanges and guided thereby.

\* \* \* \* \*